(12) United States Patent
Andela et al.

(10) Patent No.: US 7,611,877 B2
(45) Date of Patent: *Nov. 3, 2009

(54) GRANULATES CONTAINING FEED-ENZYMES

(75) Inventors: Carl Sidonius Maria Andela, Delft (NL); Willem Johan Beekman, Delft (NL); Johannes Henricus van Doesum, Zoetermeer (NL)

(73) Assignee: BASF Aktiengesellschaft (DE)

( * ) Notice: Subject to any disclaimer, the term of this patent is extended or adjusted under 35 U.S.C. 154(b) by 290 days.

This patent is subject to a terminal disclaimer.

(21) Appl. No.: 10/500,967

(22) PCT Filed: Jan. 14, 2003

(86) PCT No.: PCT/EP03/00341

§ 371 (c)(1),
(2), (4) Date: Oct. 15, 2004

(87) PCT Pub. No.: WO03/059086

PCT Pub. Date: Jul. 24, 2003

(65) Prior Publication Data

US 2006/0105024 A1 May 18, 2006

(30) Foreign Application Priority Data

Jan. 15, 2002 (EP) .................................. 02075017

(51) Int. Cl.
C12N 11/14 (2006.01)
C12N 11/02 (2006.01)

(52) U.S. Cl. ........................................ 435/174; 435/177

(58) Field of Classification Search ........................ None
See application file for complete search history.

(56) References Cited

U.S. PATENT DOCUMENTS

| | | | |
|---|---|---|---|
| 4,919,841 A | 4/1990 | Kamel et al. | |
| 4,973,417 A | 11/1990 | Falholt | |
| 4,976,977 A | 12/1990 | Johnson et al. | |
| 5,080,917 A | 1/1992 | Itoh et al. | |
| 5,186,937 A | 2/1993 | Sparks et al. | |
| 5,271,881 A | 12/1993 | Redding, Jr. | |
| 5,391,371 A | 2/1995 | Jacobsen et al. | |
| 5,837,291 A | 11/1998 | Maruyama et al. | |
| 5,879,920 A * | 3/1999 | Dale et al. ................... | 435/187 |
| 6,103,678 A * | 8/2000 | Masschelein et al. ....... | 510/101 |
| 6,136,772 A | 10/2000 | De Lima et al. | |
| 6,475,546 B1 | 11/2002 | Harz et al. | |
| 6,500,426 B1 | 12/2002 | Barendse et al. | |
| 6,589,929 B2 * | 7/2003 | De Lima et al. ............ | 510/392 |
| 2002/0034549 A1 | 3/2002 | Becker et al. | |
| 2002/0094367 A1* | 7/2002 | Fuglsang et al. ............ | 426/549 |
| 2003/0049811 A1 | 3/2003 | Barendse et al. | |
| 2003/0054511 A1 | 3/2003 | Andela et al. | |
| 2005/0163765 A1 | 7/2005 | Andela et al. | |
| 2006/0105024 A1 | 5/2006 | Andela et al. | |

FOREIGN PATENT DOCUMENTS

| | | |
|---|---|---|
| DE | 199 29 257 | 12/2000 |
| DE | 199 29 257 A1 | 12/2000 |
| EP | 0 257 996 A2 | 3/1988 |
| EP | 0 569 468 B1 | 11/1993 |
| EP | 0 758 018 | 2/1997 |
| EP | 0 758 018 A1 | 2/1997 |
| EP | 0 913 468 A2 | 5/1999 |
| JP | 06 305960 | 11/1994 |
| JP | 07 236430 | 9/1995 |
| JP | 07 236430 A1 | 9/1995 |
| JP | 08 109126 | 4/1996 |
| WO | WO-85/05288 A1 | 12/1985 |
| WO | 92 12645 | 8/1992 |
| WO | WO-92/12645 A1 | 8/1992 |
| WO | WO-94/26883 A2 | 11/1994 |
| WO | W0-97/12958 A2 | 4/1997 |
| WO | 97 16076 | 5/1997 |
| WO | WO-97/16076 A1 | 5/1997 |
| WO | 98 54980 | 12/1998 |
| WO | 98 55599 | 12/1998 |

(Continued)

OTHER PUBLICATIONS

U.S. Appl. No. 10/018,339, Harz et al.
Thoma, K., et al., "Influence of Aqueous Coatings on the Stability of Enteric Coated Pellets and Tablets", Eur. J. Pharma. Biopharma., vol. 47, No. 1, (1999), pp. 39-50.

*Primary Examiner*—Suzanne M Noakes
(74) *Attorney, Agent, or Firm*—Connolly Bove Lodge & Hutz LLP

(57) ABSTRACT

The present invention describes a process for the preparation of an enzyme-containing granulate wherein an aqueous enzyme-containing liquid is, optionally supplemented with a solid carrier and/or additive ingredients, processed into granules, dried and subsequently coated with a dispersion containing particles of a hydrophobic substance. The hydrophobic substance may be a hydrophobic fat- or wax-like substance or a hydrophobic polymeric compound. Preferably, the hydrophobic polymeric compound is a polyolefin, more preferably polyethylene and/or polypropylene. The thus coated enzyme granulate is suitable for the manufacture of animal feed compositions by mixing the granulate with feed ingredients, treating with steam and pelleting. The coated granulates show high enzyme stability during pelleting conditions and during storage. At the same time, the dissolution time of the granule is very short so that the bioavailability of the enzyme to the animal is improved.

19 Claims, No Drawings

FOREIGN PATENT DOCUMENTS

| | | |
|---|---|---|
| WO | WO-98/55599 A2 | 12/1998 |
| WO | WO-99/30671 A2 | 6/1999 |
| WO | WO-99/61210 A1 | 10/1999 |
| WO | WO-00/36927 A1 | 6/2000 |
| WO | 00 47060 | 8/2000 |
| WO | WO-00/47060 A1 | 8/2000 |
| WO | WO-01/00042 A1 | 1/2001 |
| WO | 01 25411 | 4/2001 |
| WO | WO-01/25411 A1 | 4/2001 |
| WO | WO 2008/054080 A2 | 5/2008 |

* cited by examiner even more preferably from 10 to 500 nm, most preferably from 10 to 200 nm.

GRANULATES CONTAINING FEED-ENZYMES

RELATED APPLICATIONS

This application is a national stage application (under 35 U.S.C. 371) of PCT/EP03/00341 filed Jan. 14, 2003, which claims the benefit of European application 02075017.0 filed Jan. 15, 2002.

FIELD OF THE INVENTION

The present invention relates to the formulation of enzymes, preferably feed-enzymes, into granulates. These (edible) granulates can then be used in animal feed.

BACKGROUND OF THE INVENTION

Animal feed represents one of the largest costs incurred in keeping livestock and other animals. The use of various enzymes in animal, e.g. livestock, feed has become almost common practice. These enzymes are usually produced by culturing micro-organisms in large scale fermenters operated by industrial enzyme producers. At the end of the fermentation, the resulting "broth" is usually subjected to a series of filtration steps to separate the biomass (the micro-organisms) from the desired enzyme (in solution). Subsequently the enzyme solution is concentrated and processed as a liquid (often after addition of various stabilisers) or to a dry formulation.

For economical and practical reasons, dry enzyme formulations are often preferred to liquid enzymes formulations. Nevertheless, even when a dry enzyme formulation is chosen, some steps of the feed pelleting process, such as conditioning, may be detrimental to the enzyme. Various enzyme manufacturers have developed alternative formulation methods to improve the stability of dry enzyme products during pelleting and storage of the feed. For instance, an option is to coat the enzyme-containing granule with a suitable coating agent.

EP 0 569 468 refers to a formulation consisting of an enzyme-containing granulate that is coated with a high melting wax or fat alleged to improve resistance to pelleting conditions. A disadvantage of such a coating is that the dissolution time of the granulate is long (about one hour). Therefore the bio availability of the enzyme to the animal is decreased. In addition, the granulates have a wide particle size distribution which makes it difficult to obtain an evenly distributed enzyme concentration after coating, since small particles contain a relatively high amount of coating agent as compared to large particles.

WO 00/47060 discloses the use of polyethylene glycol (PEG) as a coating material. These PEG coatings have the disadvantage that they do not increase the pelleting stability of the enzyme granulate to the desired level.

There is thus still a need for stable formulations of enzymes for use in animal feed that are cheap and easy to produce and that combine a satisfactory pelleting stability with good bio availability of the enzyme to the animal.

DETAILED DESCRIPTION OF THE INVENTION

The present invention discloses a process for the preparation of an enzyme-containing granulate suitable for use in an animal feed, the process comprising obtaining a dry enzyme-containing granule and coating the granules with a dispersion comprising particles of a hydrophobic substance dispersed in a suitable solvent. The coating of an enzyme granulate with such a dispersion provides for a low water uptake during the conditioning step of the feed preparation process and, surprisingly, an attractively short dissolution time of the enzyme granule.

To enable the formation of a suitable layer on the granule to be coated, the dispersion according to the invention preferably has a particle size as specified below and/or is homogeneous and/or is physically stable. More preferably, the particles in the dispersion have a size ranging from 10 to 1000 nm (border values included), even more preferably from 10 to 500 nm, most preferably from 10 to 200 nm.

The dispersion according to the invention is advantageously capable of forming a homogeneous layer upon drying of the coated granules.

The dispersion according to the invention further is advantageously capable of forming a water-insoluble layer upon drying at a relatively low temperature, typically a temperature substantially below the melting point of the hydrophobic substance.

The dispersion according to the invention further is advantageously capable of forming a thin layer that does not form cracks upon drying. The thin layer typically has a thickness of 50 µm or less, preferably of 20 µm or less, more preferably 10 µm or less. A lower limit in the thickness of the layer may be 1-2 µm. The thickness of the layer may be influenced by the content of the hydrophobic substance in the dispersion.

The hydrophobic substance used in the dispersion for coating an enzyme granulate according to the invention preferably has a melting point which is sufficiently high to prevent melting of the hydrophobic substance coating layer under feed pellet preparation conditions. More preferably, the melting point of the hydrophobic substance is between 40 and 200° C., most preferably between 50 and 180° C.

A suitable solvent to disperse the hydrophobic substance particles is a solvent wherein the hydrophobic substance is insoluble, e.g. a hydrophilic solvent like water or ethanol. Preferably, water is used as a solvent. The dispersion typically may contain 10 to 60% hydrophobic substance in solvent, preferably 20 to 40% hydrophobic substance in solvent.

To keep a stable dispersion, stabilising agents like surfactants may be added to the dispersion.

The hydrophobic substance preferably is water-insoluble. It may be a hydrophobic fat- or wax-like substance, such as a triglyceryl, diglyceryl or monoglyceryl ester of a higher fatty acid, a higher fatty alcohol, a higher fatty acid, or may be a hydrophobic polymeric compound.

The hydrophobic polymeric compound preferably is a polyolefin, more preferably a polyolefin wherein the olefin (hydrocarbon) monomers have a length of 2 to 10 carbon atoms, most preferably a polyolefin wherein the olefin monomers have a length of 2 to 4 carbon atoms wherein it is envisaged to optionally include monomers with a chain length of 5 to 10 carbon atoms in the polymerisation process, to obtain a polymer with short-chain branches In a preferred embodiment, the polyolefin which is used as hydrophobic polymer in the dispersion according to the invention is selected from the group consisting of polyethylene, polypropylene, polybutylene and/or polybutadiene (according to new nomenclature these polymers are called polyethene, polypropene, polybutene, polybutadiene). More preferably, the polyolefin is polyethylene and/or polypropylene.

The polyolefin may be a substantially linear polymer, i.e. a polymer which is not branched or only displays a low degree of branching. A substantially linear polymer thus may include a linear polymer with short side chains, i.e. with a length of at the most around 10 carbon atoms.

Preferably, the polyolefin has a melting range ending at a temperature ranging from 100 to 200° C. (border values included), even more preferably from 105 to 190° C., most preferably from 120 to 180° C.

For polyethylene, the molecular weight may be in the range of 3000-20,000 Da.

In a preferred embodiment of the invention, the polyolefin dispersion is a dispersion of polyolefins containing acidic groups which are stabilized with an amine, preferably a volatile amine. The acidic groups preferably are carboxylic groups and the volatile amine preferably is ammonia.

Carboxylic groups may conveniently be introduced into the polyolefin by, for instance, oxidation. The amount of acidic groups introduced in the polyolefin is characterised by the so-called acid number. The acid number of the polyolefin may range between 2 and 30 (border values included), preferably between 4 and 30, more preferably between 12 and 18, in the case of polyethylene.

Additional compounds may be added to the polyolefin dispersion to confer favourable characteristics to the dispersion. For instance, the polyolefin particles may be physically stabilised with specific compounds to prevent clotting and/or to prevent sedimentation. The dispersion may also contain compounds which promote the formation of a water-insoluble film upon drying. Examples of additional compounds are surfactants or amines.

The hydrophobic substance coating preferably is applied at 0.1-20% (weight hydrophobic substance per weight of the granules), more preferably at 0.2-10% and most preferably at 0.4-5% of the weight of the granules. The percentages used throughout this specification refer to dry weight percentages and, unless indicated otherwise, are based on the weight of the dry granulate, before coating.

To apply the hydrophobic substance and, optionally, other coating material(s) onto the granulate a number of known methods are available which include the use of a fluidised bed, a high shear granulator, a mixer granulator, or a Nauta-type of mixer. In a preferred method for application of the hydrophobic substance onto the granulate, the hydrophobic substance is sprayed as a dispersion onto a fluidized bed of the granules to be coated.

The granule to be coated according to the present invention comprises a feed enzyme, optionally, a solid carrier and, optionally, one or more additives.

The granule typically may comprise particles, 90% having a size of 300 µm or larger, with an upper size limit of about 3 mm. Alternatively, the granulate may be a microgranulate, 90% of its particles having a size of 300 µm or less, with a lower size limit of 10-25 mm.

The solid carrier that may be used in the preparation of the granulate for instance is a powder which can be compacted into a granule and which preferably has an average particle size ranging between 5 and 20 µm.

For instance, the solid carrier may essentially consist of an edible carbohydrate polymer. The numerous advantages of the use of an edible carbohydrate polymer are presented in patent application WO 98/54980.

An edible carbohydrate polymer is a carbohydrate polymer which is allowed for use as a feed additive. The edible carbohydrate polymer is chosen so that it is edible by the animal for whom the feed is intended, and preferably digestible as well. The polymer preferably comprises hexose polymer units, more preferably glucose polymer units. Most preferably the carbohydrate polymer comprises α-D-glucopyranose units, amylose (a linear (1→4) α-D-glucan polymer) and/or amylopectin (a branched D-glucan with α-D-(1→4) and α-D-(1→6) linkages). Starch is the preferred carbohydrate polymer. Other suitable hexose-containing polymers that can be used instead of, or in addition to starch, include α-glucans, β-glucans, pectin (such as proto-pectin), and glycogen. Derivatives of these carbohydrate polymers, such as ethers and/or esters thereof, are also contemplated. Suitably the carbohydrate polymer is water-insoluble.

In other embodiments of the invention, one or more additional ingredients may be incorporated into the granulate, e.g. as processing aids and/or for further improvement of the pelleting stability and/or the storage stability of the granulate. A number of such additives are discussed below.

In one embodiment of the invention, the additive comprises a water soluble inorganic salt (as suggested in EP 0 758 018). Preferably, the granules comprise at least 0.1% of a water soluble inorganic salt comprising a divalent cation, more preferably zinc. Most preferably, the inorganic salt is zinc-sulphate. The end product preferably contains from 500-1,500 mg Zn/kg end product, more preferably 700-1,300 mg Zn/kg end product and most preferably 900-1,100 mg Zn/kg end product. Divalent cations are preferred because they provide the best storage and processing stability. Sulphate is preferred as anion because it provides the best drying yield. The salts may be added (e.g. to the mixture) in solid form. Alternatively, the salt(s) may be dissolved in the water or enzyme-containing liquid, for instance prior to mixing with the solid carrier.

Further improvement of the pelleting stability may be obtained by the incorporation of hydrophobic, gel-forming and/or slowly dissolving compounds into the formulation. These may be provided by adding at least 0.1% (w/w), preferably at least 0.5% and more preferably at least 1% of the desired compound (based on the weight of water and, if present, solid carrier ingredients) to the mixture to be processed to granules. Suitable substances include derivatised celluloses, such as HPMC (hydroxy-propyl-methyl-cellulose), CMC (carboxy-methyl-cellulose), HEC (hydroxy-ethyl-cellulose), polyvinyl alcohols (PVA); and/or edible oils. Edible oils, such as soy oil or canola oil, may be added (e.g. to the mixture to be granulated) as a processing aid.

In the process of preparing a granulate, the enzyme and water are preferably provided as an enzyme-containing (preferably aqueous) liquid, such as a solution or a slurry, that is from, or derived from, a microbial fermentation process. This fermentation process will usually be one in which the enzyme is produced. The fermentation process may result in a broth which contains the micro-organisms (which produced the desired enzyme) and an aqueous solution. This aqueous solution, once separated from the micro-organisms (for example, by filtration) can be the enzyme-containing aqueous liquid used in the invention. Thus in preferred embodiments the enzyme-containing aqueous liquid is a filtrate. Usually the enzyme will be in an active form. Preferably the liquid is in a concentrated form, such as an ultra-filtrate (UF), which may allow the production of a granulate with a desired activity level.

If a solid carrier is used, the amount of enzyme-containing liquid (and so enzyme) that can be absorbed onto the carrier is usually limited by the amount of water that can be absorbed. The enzyme solution may contain about 25% (w/w) dry matter. The amount of water added to the solid carrier is such that (substantially) all the water in the aqueous liquid is absorbed by all the components present in the solid carrier. The use of higher temperatures in order to absorb a greater amount enzyme-containing liquid is also contemplated by the present invention, and indeed is preferable especially when dealing with thermostable enzymes. For these enzymes therefore mixing of the solid carrier and liquid (or enzyme and water) is performed at a temperature above 30° C., preferably above 40° C. and more preferably above 50° C. Alternatively or in addition, the liquid may be provided at this temperature. In general, non-swelling conditions of the solid carrier (at lower temperatures) are preferred to minimise loss arising from instability of (heat sensitive) enzymes at higher temperatures.

The water or enzyme-containing liquid may comprise one or more enzyme(s). Suitable enzyme(s) are feed enzymes to be included in animal feed (including pet food). The function of these feed enzymes is often to improve the feed conversion rate, e.g. by reducing the viscosity or by reducing the anti-nutritional effect of certain feed compounds. Feed enzymes (such as phytase) may also be used such as to reduce the amount of compounds in the manure which are harmful to the environment.

In one embodiment, granules are prepared that contain a high concentration of a feed enzyme. The advantages of preparing phytase compositions at a high concentration were already described in WO 98/55599.

Suitable enzymes include: phosphatases, such as phytases (both 3-phytases and 6-phytases) and/or acid phosphatases, carbohydrases, such as amylolytic enzymes and/or plant cell wall degrading enzymes including cellulases such as β-glucanases and/or hemicellulases such as xylanases or galactanases and/or pectinases, proteases or peptidases such as lysozyme, galactosidases, esterases, lipases, phospholipases such as the mammalian pancreatic phospholipases A2 and glucose oxidase. Preferably, the feed enzyme at least is an enzyme selected from the group consisting of phytases, xylanases, β-glucanases, proteases, phospholipases and glucose oxidases. More preferably, the feed enzyme at least is an enzyme selected from the group consisting of phytases and xylanases.

If the enzyme is a phytase, then the final granulate may preferably have an enzyme activity ranging from 4,000 to 20,000 FTU/g, more preferably from 5,000 to 20,000 FTU/g, most preferably from 5,000 to 15,000 FTU/g. One Phytase Unit (FTU) is thereby defined as the amount of enzyme which liberates 1 μmol inorganic phosphate per minute from sodium phytate (0.0051 mol/litre) at 37° C. and at a pH of 5.5 under the conditions that phytase activity was determined according to the procedure "ISL-method 61696" (manual molybdate-vanadate assay).

If the enzyme is a xylanase, then the final granulate may preferably have an enzyme activity ranging from 5,000 to 100,000 EXU/g, more preferably from 10,000 to 100,000 EXU/g, and most preferably from 15,000 to 100,000 EXU/g. One Endo-Xylanase Unit (EXU) is thereby defined as the amount of enzyme which liberates 4.53 μmol reducing sugars, measured as xylose equivalents, per minute under the conditions of the procedure "ISL-method 61731".

ISL-methods are obtainable on request from DSM, Food Specialties, Agri Ingredients, A. Fleminglaan 1, P.O. Box 1, 2600 MA, Delft, The Netherlands.

In addition to these feed enzymes, the invention is equally applicable to non-enzymatic polypeptides with biological activities, such as antigenic determinants to be used as vaccines and/or polypeptides engineered to have an increased content of essential amino acids, of which the biological activity may be sensitive to thermal inactivation.

The granulate to be coated according to the invention may be prepared by drying an enzyme-containing aqueous solution, for instance an ultra-filtrate as described hereinbefore, in particular by spray drying or multistage drying. Optionally, additives may be added prior to or during drying, for instance as processing aids or to improve pelleting stability. Furthermore, an inert compound or material may be added during drying, for instance an inorganic salt, maltodextrins, granulated flour, resulting in so called co-drying.

Alternatively, the granulate to be coated may be prepared by mechanically processing a mixture of the enzyme, water (e.g. an enzyme-containing liquid), a solid carrier and optionally additives by known techniques frequently used in food, feed and enzyme formulation processes. This mechanical processing for instance comprises expansion, extrusion, spheronisation, pelleting, high-shear granulation, drum granulation, fluid bed agglomeration or a combination thereof. These processes are usually characterised by an input of mechanical energy, such as the rotation of a screw or a mixing mechanism, the pressure of a rolling mechanism of a pelleting apparatus, the movement of particles by a rotating bottom plate of a fluid bed agglomerator or the movement of the particles by a gas stream, or a combination thereof. These processes allow the solid carrier (e.g. in the form of a powder), to be mixed with the enzyme and water, for example an enzyme-containing liquid (an aqueous solution or slurry), and so subsequently granulated. Alternatively the solid carrier can be mixed with the enzyme (e.g. in a powder form) to which water, such as a liquid (or slurry) is then added (which can act as granulating liquid).

In yet a further embodiment of the invention the granulate (e.g. an agglomerate) is formed by spraying or coating the enzyme-containing liquid onto a carrier, such as in a fluid bed agglomerator. Here the resulting granules can include an agglomerate as can be produced in a fluid bed agglomerator. Preferably the mixing of the enzyme-containing liquid and the solid carrier additionally comprises kneading of the mixture before extrusion. This may improve the plasticity of the mixture in order to facilitate granulation.

If the granulate is formed by extrusion this is preferably performed at low pressure. This may offer the advantage that the temperature of the mixture being extruded will not, or only slightly, increase. Low-pressure extrusion includes extrusion for example in a Fuji Paudal-type of basket- or dome-extruder.

The extrudate obtained can be subjected to rounding off (e.g. spheronisation), such as in a Marumeriser™ and/or compaction. The extrudate can be spheronised prior to drying since this may reduce dust formation in the final granulate and/or may facilitate any coating of the granulate.

The granules can then be dried, such as in a fluid bed drier or, in case of the fluid bed agglomeration, can be immediately dried (in the agglomerator) to obtain (solid dry) granulates. Other known methods for drying granules in the food, feed or enzyme industry can be used by the skilled person. Suitably the granulate is flowable. The drying preferably takes place at a product temperature from 25 to 60° C., preferably from 30 to 50° C.

The dry granulate thus obtained then is subjected to the coating with a dispersion according to the invention. The present invention further envisages that a granulate may be coated with a coating layer different form a hydrophobic substance layer according to the invention, prior to applying the dispersion according to the invention.

Preferably the granules obtained after coating have a relatively narrow size distribution (e.g. they are monodisperse). This can facilitate a homogeneous distribution of the enzyme granulate in the feed pellets. The process of the invention tends to produce granulates with a narrow size distribution. The granules may be of irregular (but preferably regular) shape, for example approximately spherical.

If necessary, an additional step may be included in the process to further narrow the size distribution of the granules, such as screening.

The enzyme-containing granulate obtainable by the process according to the invention (which forms another aspect of the invention) seeks to solve or at least mitigate the problems encountered in the prior art. These coated granulates have a high pelleting stability and a short dissolution time. Therefore the bioavailability of the enzyme to the animal is improved as compared to classical fat-coated granules.

The invention thus provides an enzyme-containing granulate obtainable by the above-mentioned processes and having the following characteristics. The granulate consists of granules containing a feed enzyme, optionally, a solid carrier and, optionally, one or more additives, coated with hydrophobic substance layer.

The granulate of the invention is suitable for use in the preparation of an animal feed. In such processes the granulate is mixed with feed substances, as such, as part of a premix or as precursor to an animal feed. The characteristics of the granulate according to the invention allows its use as a component of a mixture which is well suited as an animal feed, especially if the mixture is steam treated, subsequently pelleted and optionally dried.

Thus, a further aspect of the present invention relates to a process for the preparation of animal feed, or a premix or precursor to an animal feed, the process comprising mixing the granulate provided by the present invention with one or more animal feed substances or ingredients.

The present invention also relates to a process for promoting the growth of an animal, the process comprising feeding an animal a diet that comprises the granulate provided by the invention. Here, the animal diet can include either the granulate itself, or the granulate present in a feed. Suitable animals include farm animals, such as livestock, pigs and poultry, and fish.

Another aspect of the invention thus relates to a composition comprising the granulate of the invention, which composition is preferably an edible feed composition such as an animal feed.

Still another aspect of the present invention relates to the use of the granulate of the invention in, or as a component of, an animal feed or for use in an animal diet.

Preferred features and characteristics of one aspect of the invention are equally applicable to another mutatis mutandis.

The following Examples are presented merely to illustrate the invention, and are not intended, or to be construed as, being limiting.

EXAMPLES

General Methods

Preparation of Phytase-containing Granules

Phytase-containing granules are prepared according to the process described in WO98/54980.

Conditioning/Pelleting Step:

50 grams granules were mixed in 10 kg feed of the premix of choice and mixed just before the test with 240 kg of the same recipe. This 250 kg mixture was dosed in a mixer/conditioner by a dosing screw, at a speed of 600 kg/h, where it was heated by direct steam around 80° C. The residence time was about 30-40 seconds whereupon the hot mixture was pushed into the pelleting press. The pellets coming out of the die have a temperature between 80 and 82° C. and fall on a cooling belt. From this belt, samples were taken for the stability measurement.

Poultry Feed used for Analysis of Pelleting Stability:

Maize (50%), peas (5%), soybean meal (28%), tapioca (1.98%), fish meal (2.5%), feather meal (1.5%), soybean oil (1.75%), animal fat (3.5%), Mervit (Premervo, Utrecht, The Netherlands) 100 (1%), limestone (1.1%), mono calcium phosphate (1.22%), salt (0.3%), Mervit 394 (0.65%), Mervit 393 (1.5%), up to a total of 100%.

Analysis of Phytase Activity in Feed Pellets:

Phytase activity was determined according to the procedure "ISL-method 61696" (manual molybdate-vanadate assay).

Example 1

300 grams uncoated granules (batch NPHG 498) were put into a STREA fluid bed apparatus from NIRO-AEROMATIC.

With a topspray device (two-phase nozzle), various coatings were sprayed onto the granules as indicated in Table 1. These coated granules were tested in the pelleting test as described under General methods.

HS granules are granules coated with a fat+anti-caking coating (>30%) (obtained from Novo Nordisk, batch no. HF 98011450).

TABLE 1

Residual phytase activity in poultry feed in % after conditioning/pelleting at 80/81° C.

| Sample no. with coating | Dissolution time (min.) | Residual activity (%) |
|---|---|---|
| A uncoated batch 498 | 1 | 27 |
| B 10% PEG 6000 solution | 2 | 30 |
| C 10% Carnauba wax dispersion | 1 | 36 |
| D 10% PE dispersion Stamylan ® LD1965 | 1 | 32 |
| E 10% PE dispersion EXACT ® 8210 | 20 | 48 |
| F 8% PE Dispersion 1205 | 5 | 57 |
| G HS granule | >60 | 55 |

Surprisingly, the dissolution time of the granulates does not seem to correlate with their pelleting stability. The most important parameter to optimise is the dissolution time, since it determines the bioavailability of the enzyme to the animal.

The coatings of samples C and F were bought from Paramelt B.V. (Heerhugowaard, The Netherlands) and of samples D and E from DSM Research (DSM N.V., Geleen, The Netherlands).

Example 2

The effect of the coating Dispersion 1205 on the pelleting stability of phytase-containing granulates was tested in large scale production.

In a GPCG 300 fluid bed machine from Glatt, 300 kg of uncoated granulate, prepared as described under General methods, was coated with 120 kg Dispersion 1205 à 19.5% dry matter (sample L) and another batch with 60 kg PEG 6000 solution à 50% dry matter (sample K).

These coated granulates were tested in a pelleting test together with the uncoated product (sample H) and HS granule of a competitor (sample M) as described under General methods.

The results are presented in Table 2.

TABLE 2

Residual phytase activity in poultry feed in % after conditioning/pelleting at 80/80° C.

| Sample no. with coating | Dissolution time (min.) | Residual activity (%) |
|---|---|---|
| H Uncoated batch S4893 | 1 | 33 |
| K Coated with PEG 6000 | 2 | 36 |
| L Coated with PE Dispersion 1205 | 10 | 74 |
| M HS-granule | >60 | 76 |

Example 3

In a Glatt GPCG 1.1 fluid bed coater, 1 kg of uncoated granulate, prepared as described under General methods, was coated with different coatings as mentioned in Table 3.

Samples O was coated with a melt at a temperature of 80° C. Sample P was coated with a self-made dispersion of sodium caseinate and hydrogenated coconut fat.

TABLE 3

Residual phytase activity in poultry feed in % after conditioning/pelleting at 80/80° C.

| Sample no. with coating | Dissolution time (min.) | Residual activity (%) |
|---|---|---|
| N Uncoated batch 5193 | 1 | 20 |
| O Coated with 10% Waretta fat | 4 | 22 |
| P Coated with 10% fat dispersion | 10 | 25 |
| M HS granule | >60 | 53 |

The various fat-type coatings tested (except the one from the HS granule M) confer a short dissolution time to the granules, but the pelleting stability of the coated granules is not significantly improved as compared to the uncoated granulate (sample N).

Example 4

The influence of different concentrations of Dispersion 1205 (2 to 24%, samples S to V) on the pelleting stability and on the dissolution time of the granulate was tested. Uncoated granulates were prepared as described under General methods. The granules were coated as indicated in Table 4 and tested in a pelleting test as described under General Methods.

The results are presented in Table 4.

TABLE 4

Residual phytase activity in poultry feed in % after conditioning/pelleting at 80/80° C.

| Sample no. with coating | Dissolution time (min.) | Residual activity (%) |
|---|---|---|
| R Uncoated batch 5193 | 1 | 22 |
| S Coated with 2% Dispersion 1205 | 2 | 31 |
| T Coated with 4% Dispersion 1205 | 2 | 49 |
| U Coated with 8% Dispersion 1205 | 2 | 58 |
| V Coated with 24% Dispersion 1205 | 60 | 75 |
| M HS granule | >60 | 64 |

The concentration of the polyethylene which is applied to coat the granules seems to be positively correlated with the dissolution time of the granules.

Example 5

In this example the influence of a polypropylene (PP) dispersion and of polyethylene (PE) dispersions from different suppliers were tested. Uncoated granules were prepared as described General methods. The granules were then coated as indicated in Table 5 and tested in a pelleting test as described under general methods.

The results are presented in Table 5.

TABLE 5

Residual phytase activity in poultry feed in % after conditioning/pelleting at 80/80° C.

| Sample no. with coating | Dissolution time (min) | Residual activity (%) |
|---|---|---|
| W Uncoated batch 5193 | 1 | 21 |
| X Coated with 4% Permanol Z (PE) | 1 | 38 |
| Y Coated with 4% Permanol 601 (PP) | 1 | 43 |
| Z Coated with Dispersion 1205 (PE) | 1 | 39 |

All three coatings, the Permanol samples (X+Y) from Clariant GmbH, Frankfurt am Main) and the Dispersion 1205 from Paramelt BV gave about a twice as high residual activity than the uncoated sample and still ensured the same dissolution time.

The Permanol 601 is a PP coating with a higher melting point (30° C. higher) than the PE, but also with a larger particle size (10 times larger) in the dispersion than the Dispersion 1205.

Example 6

In this example another comparison of the influence of a polypropylene (PP) dispersion and of polyethylene (PE) dispersions from different suppliers was made. Uncoated granules were prepared as described in General methods. The granules were then coated as indicated in Table 6 and tested in a pelleting test as described under General methods.

The results are presented in Table 6.

TABLE 6

Residual phytase activity in poultry feed in % after conditioning/pelleting at 80/80° C.

| Sample no. with coating | Dissolution time (min) | Residual activity (%) |
|---|---|---|
| A uncoated batch R2236/R3305 | 1 | 31 |
| B Coated with 4% PE Dispersion 1286 | 1 | 42 |
| C Coated with 4% Permanol Z (PE) | 1 | 44 |
| D Coated with 4% Permanol AAP5 (PP) | 1 | 41 |
| E Coated with 4% Permanol AAP5 with ammonia (PP) | 1 | 46 |
| F Coated with 4% Polygen WE6 (BASF) | 1 | 40 |
| G Coated with 4% Polygen WE7 (BASF) | 1 | 39 |

All three coatings, the Permanol (C, D, E) samples from Clariant GmbH, Frankfurt am Main, the Dispersion 1286 from Paramelt BV (B) and the Polygen WE6 and WE7 coatings (F, G) from BASF Aktiengesellschaft, Ludwigshafen, gave significant higher residual activity than the uncoated sample and still ensured the same dissolution time.

The invention claimed is:

1. A granulate comprising granules which comprise an enzyme coated with a polyolefin, wherein the polyolefin is polyethylene, polypropylene, polybutylene and/or polybutadiene, and wherein the polyolefin has a melting range of from 100 to 200° C.

2. The granulate of claim 1, wherein the enzyme is a phytase, xylanase, β-glucanase, protease, phospholipase, amylase and/or glucose oxidase.

3. The granulate of claim 1, wherein the polyolefin is substantially linear.

4. The granulate of claim 1, wherein the polyolefin has a molecular weight of 3000 to 20,000 Da.

5. The granulate of claim 1, wherein the polyolefin contains acid groups and the acid number of the polyolefin is 2 to 30.

6. The granulate of claim 1, wherein the granules have a coating of the polyolefin with a thickness of 20 μm or less.

7. The granulate of claim 1, wherein the granules contain 0.1 to 20% by weight of the polyolefin.

8. The granulate of claim 1, wherein the granules further comprise a solid carrier.

9. The granulate of claim 8, wherein the solid carrier is an edible carbohydrate polymer.

10. The granulate of claim 1, wherein the granules further comprise a water soluble inorganic salt.

11. The granulate of claim 1, wherein the granules further comprise a hydrophobic, gel-forming and/or slowly dissolving compound.

12. The granulate of claim 1, wherein the enzyme is a phytase.

13. The granulate of claim 1, wherein the enzyme is a xylanase.

14. The granulate of claim 1, which is produced by a process comprising coating granules comprising the enzyme with the polyolefin.

15. A process of preparing the granules of claim 1, comprising coating granules comprising the enzyme with the polyolefin.

16. A feed composition comprising a feed and the granulate of claim 1.

17. A method of preparing the composition of claim 16, comprising combining the feed and the granulate.

18. A granulate comprising granules which comprise an enzyme coated with a polyolefin, wherein the polyolefin is polyethylene, polypropylene, polybutylene and/or polybutadiene.

19. A granulate comprising granules which comprise an enzyme coated with a polyolefin, wherein the polyolefin has a melting range of from 100 to 200° C.

* * * * *

UNITED STATES PATENT AND TRADEMARK OFFICE
CERTIFICATE OF CORRECTION

PATENT NO. : 7,611,877 B2  Page 1 of 1
APPLICATION NO. : 10/500967
DATED : November 3, 2009
INVENTOR(S) : Andela et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twelfth Day of October, 2010

David J. Kappos
*Director of the United States Patent and Trademark Office*